April 18, 1961  C. M. ABLOW ET AL  2,980,330
ANALOG PROGRAMMING SYSTEM

Filed Oct. 19, 1956  2 Sheets-Sheet 1

INVENTORS
CLARENCE M. ABLOW
GEORGES BRIGHAM
BY
Reynolds, Beach & Christensen
ATTORNEYS April 18, 1961
C. M. ABLOW ET AL
2,980,330
ANALOG PROGRAMMING SYSTEM
Filed Oct. 19, 1956
2 Sheets-Sheet 2
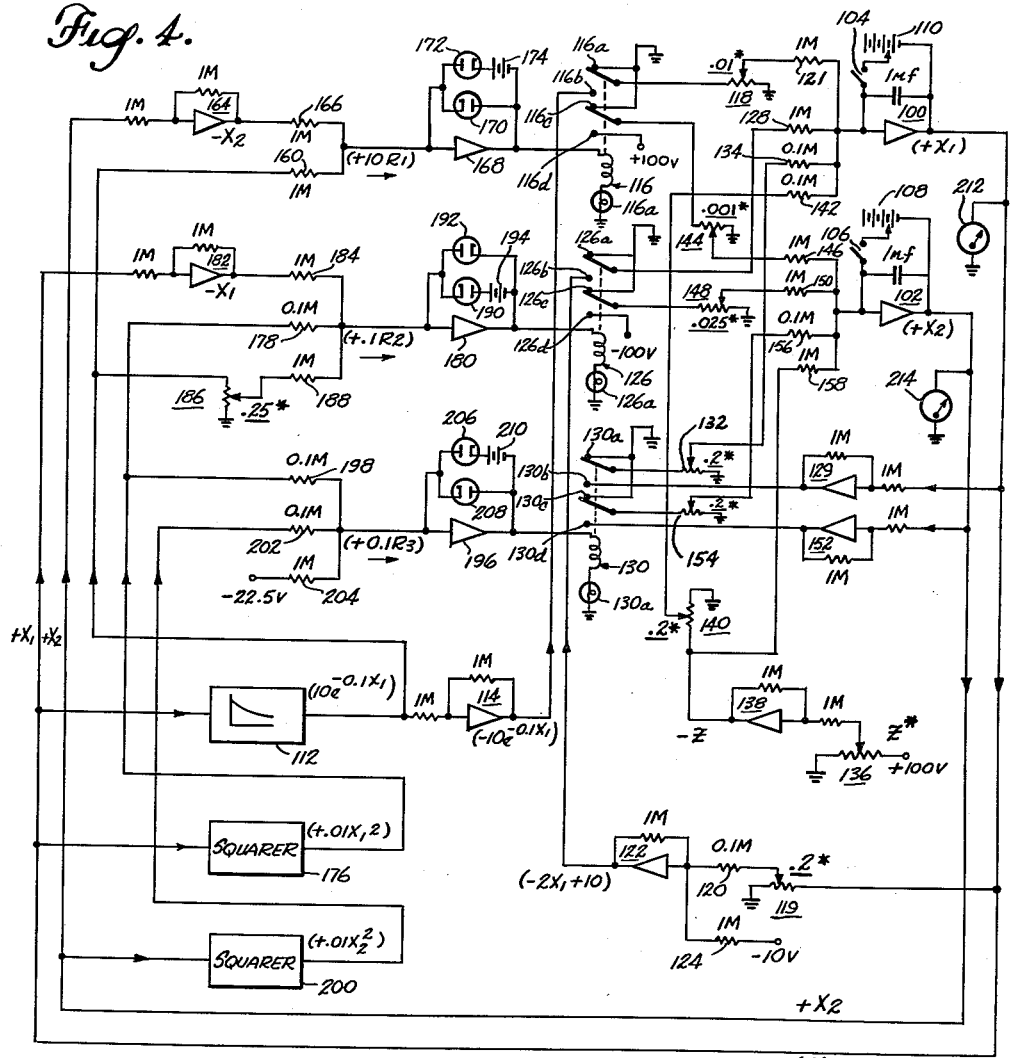
*FRACTIONAL SETTING OF POTENTIOMETERS
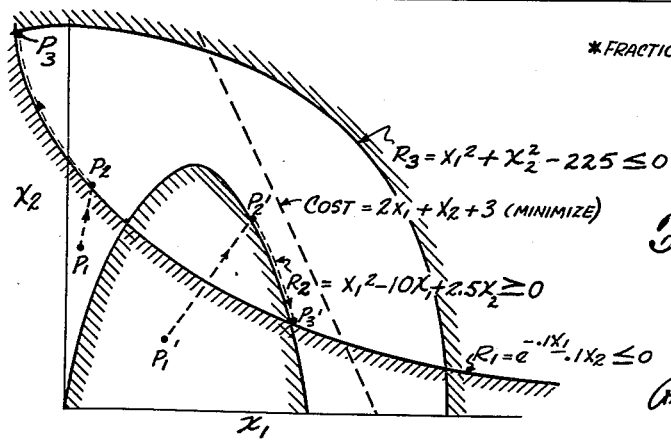
INVENTORS
CLARENCE M. ABLOW
BY GEORGES BRIGHAM
ATTORNEYS

United States Patent Office

2,980,330
Patented Apr. 18, 1961

2,980,330

ANALOG PROGRAMMING SYSTEM

Clarence M. Ablow, Belmont, Calif., and Georges Brigham, Beaconsfield, England, assignors to Boeing Airplane Company, Seattle, Wash., a corporation of Delaware Filed Oct. 19, 1956, Ser. No. 617,186

18 Claims. (Cl. 235—184)

This invention relates to programming computer apparatus for determining the values of unknown quantities which satisfy a predetermined criterion function of such unknowns when such criterion function is either maximized or minimized, without violating predetermined constraint functions of said unknowns. An example of a problem soluble by the apparatus is as follows: A manufacturer of animal feeds desires to produce a particular feed as cheaply as possible subject to appearance, nutritional and palatability requirements. For nutritional reasons the protein, fat, fiber, etc. content must be above or below certain specified amounts, and for reasons of taste and appearance certain minimum and maximum amounts of each basic ingredient must be used. For example, there may be some 14 ingredients to be used and 49 conditions to be satisfied. The amount of nutrient contributed by each ingredient and the cost of the ingredients are known. The cost may, of course, be expressed in terms of the unknown quantities of the different ingredients. The problem is then to minimize the resulting cost or criterion function in order to determine the values of the unknown quantities of the ingredients to be used which will yield a minimum total cost while satisfying the other requirements, referred to herein as "constraint functions," which are also expressed in terms of the unknown quantities.

The invention is herein illustratively described by reference to presently preferred embodiments thereof constituted for the solution of relatively simple illustrative problems. However, it will be recognized that certain modifications and equivalent forms may be used in practicing the invention and that the specific nature and arrangement of actual computer apparatus in a given case will be governed at least in part by the problems being solved.

A broad object of the invention is to enable solving problems of the described type quickly and accurately and by means of apparatus which is simple and inexpensive, compared with certain digital computer apparatus which has heretofore been used for such purposes.

Another and related object is to provide apparatus of the described type which may be constituted to solve problems having any given number of unknowns and constraint functions thereof, and wherein the constraint and criterion functions may be either linear or nonlinear.

In most programming problems the conditions affecting the unknowns are represented by some equalities and some inequalities. In developing the formulae expressing the problem for solution by the present method, substitution in the other equalities and inequalities reduces the number of unknowns and the number of conditions these unknowns must satisfy. By carrying this process to completion the equalities will be eliminated, leaving the problem expressed in terms of a minimum number of unknowns, such as "$n$" of them, satisfying a minimum number of inequalities, such as "$m$" of them.

By a renumbering, if necessary, the $n$ unknowns become $x_1, x_2, \ldots x_i, \ldots, x_n$. The $m$ inequalities can be written, using a sign of change to express all the inequalities in the form of functions greater than zero.

The present method expressed rigorously in its general form is as follows:

To find $x_i$ which minimize or maximize the criterion $C(x_i)$ subject to the constraints $R_k(x_i) \geqq 0$, define the $x_i$ as $X_i(t)$ (viz. as an analog function of time $t$) such that $$\lim_{t \to \infty} X_i(t) = x_i$$

for values of $x_i$ which satisfy $R_k(x_i) \geqq 0$ and minimize or maximize $C(x_i)$. It can be shown that defining $$\frac{dX_i}{dt} = \sum_{k=1}^{m} S_k R_{k,i} \pm z C_{,i}$$

yields such an $X_i(t)$. In the above, $k = 1, 2, \ldots m$;

$$R_{k,i} = \frac{\partial R_k}{\partial x_i}; \quad C_{,i} = \frac{\partial C}{\partial x_i}$$

$z$ is a nonnegative (or negative in the case of a problem of maximizing the criterion function) parameter that can be made as small as desired (i.e., reduced to zero; and for one method of solution, the preferred method hereinafter described, $$S_k = \begin{cases} p_k \text{ if } R_k < 0 \\ 0 \text{ if } R_k \geq 0 \end{cases}$$

or for an alternative method of solution $$S_k = \begin{cases} -p_k R_k \text{ if } R_k < 0 \\ 0 \text{ if } R_k \geq 0 \end{cases}$$

In a convenient geometrical language, the $x_i$ (or $X_i$) are coordinates of "particle" $x$ (or $X$) in an $n$-dimensional space. The $$\frac{dx_i}{dt} \left( \text{or } \frac{dX_i}{dt} \right)$$

are components of the "velocity vector" $v$ of the particle. This velocity is the sum of velocities in the direction of increase of each $R_k$ as long as that $R_k$ is negative, i.e. as long as constraint $R_k$ is not satisfied, plus a small velocity in the direction of decrease or increase of the criterion function. As each of the individual constraints are satisfied the corresponding velocity component is dropped out. Eventually then the $R_k$ functions will increase to zero and the constraints will thus be satisfied. If the velocity decreasing (or increasing) the criterion function is then reduced to zero, the point or particle $x$ will come to rest at a minimum (or maximum) of the criterion function satisfying all the constraints.

In carrying out the invention as herein disclosed, the unknowns, even though in fact static and independent of time, are treated analogically as though they were variable functions of time. In other words, "time variation" of the unknowns and the derivatives thereof are represented in terms of a fictitious analog time. By setting up the criterion and constraint functions in analog computer apparatus and causing the unknowns represented therein to vary in value until the constraints are all satisfied and the criterion minimized (or maximized, if the problem so requires) the desired values of the respective unknowns are determined.

Accordingly, analog apparatus embodying the invention comprises integrating means for deriving the unknowns by integration of the respective time derivatives of the constraint and criterion functions with respect to such unknowns, means for generating such time derivatives of the constraint and criterion functions from the derived unknowns, means for generating the constraint functions from the derived unknowns for limiting further change of the unknowns upon satisfaction of the constraint functions, means, desired for obtaining an optimum solution, for progressively reducing (or increasing) the value of the generated derivative of the criterion function as the constraint functions become satisfied so as to permit the system to attain equilibrium with the criterion function at a minimum (or maximum), and means to measure the values of the unknowns when such equilibrium is attained.

In the preferred embodiment, wherein problems involving nonlinear as well as linear functions may be solved, relays or equivalent switch means are arranged to detect the conditions of satisfaction of the respective constraint functions and thereupon to interrupt application to the different integrating means of the associated derivatives of such constraint functions with respect to the different unknowns. Thus the different constraint derivative velocity components of the "particle" drop out as each achieves its purpose in driving the system toward the desired condition of equilibrium.

These and other features, objects and advantages of the invention will become more fully evident from the following description thereof by reference to the accompanying drawings.

Figure 3 is a graphical representation of a somewhat more complex problem, involving nonlinear functions.

Figure 4 is a schematic diagram of novel computer apparatus constituting a preferred embodiment of the invention for solving the problem postulated in Figure 3.

Figure 1:
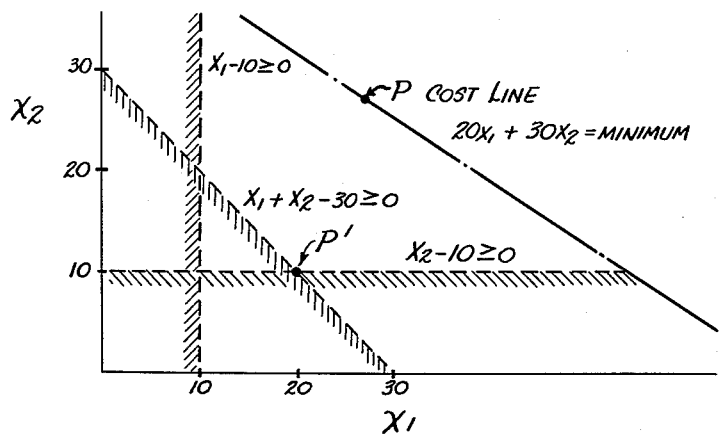
Figure 1 is a graphical representation of a relatively simple linear function problem soluble by the computer apparatus.

In Figure 1 a relatively simple linear programming problem is graphically illustrated. In words, the problem is to minimize the cost function $20x_1 + 30x_2$ in order to determine the optimum values of unknowns $x_1$ and $x_2$ while observing the three constraints $$x_1 - 10 \geq 0$$
$$x_2 - 10 \geq 0$$
$$x_1 + x_2 - 30 \geq 0$$

The variable point P with coordinates $x_1$, $x_2$ must remain on the cost line which in the example is a straight line with given slope. The regions on the cross-hatched side of the constraint lines are forbidden to the point P. Minimizing cost means placing the point P so that the cost line is as near to the origin as possible. In the example the solution is obviously to place P at point (20, 10).

Utilizing the time analog method of the present invention requires the representation of unknowns $x_1$ and $x_2$ as the integrals of the sums of the time derivatives of the constraint and criterion functions with respect to such unknowns. Thus the analogs of these variables must be represented as follows:

$$x_1 = \int \left[ \begin{Bmatrix} 10 \\ 0 \end{Bmatrix} + 0 + \begin{Bmatrix} 10 \\ 0 \end{Bmatrix} - 20z \right] dt$$

$$x_2 = \int \left[ 0 + \begin{Bmatrix} 10 \\ 0 \end{Bmatrix} + \begin{Bmatrix} 10 \\ 0 \end{Bmatrix} - 30z \right] dt$$

where the upper number in the first term is used if the first inequality is not satisfied and similarly for the second and third terms and corresponding inequalities.

Figure 2:
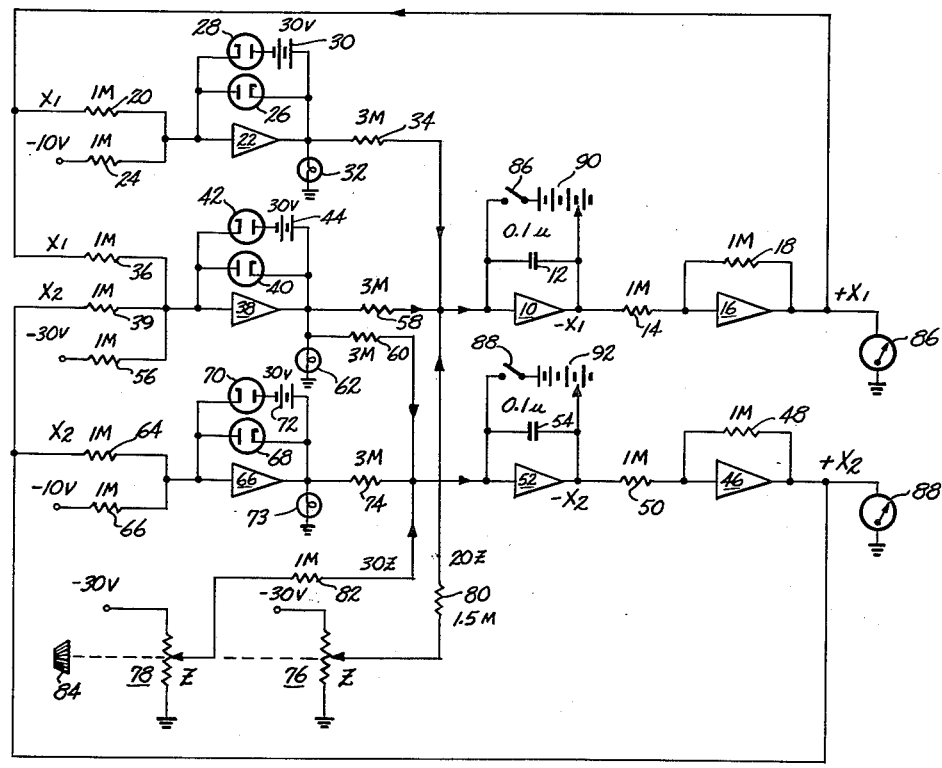
Figure 2 is a schematic diagram of novel computer apparatus according to the invention for solving the problem postulated in Figure 1.

Electrical analog apparatus suitable for performing the required switching (i.e. limiting), adding and integrating operations in the solution of the problem under consideration is shown in Figure 2. The triangular blocks and associated feedback elements shown in this figure represent operational amplifiers. Operational amplifiers are well known in the art and require no detailed description herein. The operational amplifier 10 having the feedback condenser 12 constitutes an integrating device having an output which represents the negative of the unknown $x_1$. This output is fed through a resistance 14 to the input of operational amplifier 16 having a matching feedback resistance 18 which makes it a sign changing device whose output is the positive of unknown $x_1$. The latter is fed through resistance 20 to the input of operational amplifier 22. Also connected to the input of this amplifier, through an equal resistance 24, is a source of minus 10 volts. The two resistances 20 and 24 so connected form an adding network such that the resulting input to amplifier 22 is equal to $(x_1 - 10)$ in volts. The cathode of a first diode 26 is connected to the amplifier output and the anode thereof to the amplifier input or summing junction. The cathode of a second diode 28 is likewise shunted across the operational amplifier but with a polarity relationship opposite that of the first diode and with a direct voltage source 30 interposed in series therewith, with its positive terminal directed toward the amplifier output.

Amplifier 22 with its associated diodes and voltage source functions as a switch or limiter. Whenever $(x_1 - 10)$ is positive, i.e., the first constraint in the problem under consideration as stated above is satisfied, the output of amplifier 22 tends to be negative. However, it cannot become appreciably negative as diode 26 clamps the amplifier output essentially to ground potential, which is essentially the input or summing junction potential because of the essentially infinite gain of the amplifier. Thus the output is then zero. The output is also zero if $(x_1 - 10)$ is zero. But if $(x_1 - 10)$ is a negative voltage the amplifier output tends to become positive, making diode 28 conduct. Because the amplifier has essentially infinite gain the voltage source 30 then establishes the amplifier output voltage at 30 volts, the voltage selected for source 30. This voltage value is selected in the instant case as a convenient value which will cause the computer to satisfy the first constraint, $(x_1 - 10 \geq 0)$ at a suitable rate. Obviously it is an arbitrarily chosen voltage and other values may be used instead, as may the similar voltages in the other limiters to be described.

A 30 volt indicator lamp connected to the output of amplifier 22 becomes illuminated when the constraint $(x_1 - 10 \geq 0)$ is not satisfied, during which time the 30 volts output of the limiter comprising amplifier 22 is fed through a resistance 34 to the input of integrator 10, 12. Time integration of this positive voltage representing one component of integrator input voltage, results in a progressively increasing value for $x_1$, such increase continuing until the constraint $(x_1 - 10 \geq 0)$ is satisfied, whereupon the output of amplifier 22 is clamped to ground by diode 26 and $x_1$ undergoes no further change from this source.

The voltage value of $x_1$ from sign-changing amplifier 16 is also fed through adding network resistance 36 to the input of operational amplifier 38 having bypass diodes 40 and 42 and voltage source 44 similar to the corresponding elements associated with amplifier 22. Also fed to the input of limiter-amplifier 38, through adding network resistance 39, is the voltage value of $x_2$. The latter is produced at the output of sign-changing amplifier 46 of the operational type having feedback resistance 48. The negative of $x_2$ is produced for delivery to amplifier 46 through resistance 50 by the integrator comprising operational amplifier 52 having feedback condenser 54. The final component of input voltage fed to amplifier 38 is minus 30 volts applied through adding network resistance 56. Resistances 36, 39 and 56 to which the different components of input voltage are applied constitute an adding network subjecting limiter amplifier 38 to the sum $(x_1 + x_2 - 30)$, representing the second constraint function in the specific problem under consideration. The output of amplifier 38 is applied through resistance 58 to the input of integrator 10, 12 and through resistance 60 to the input of integrator 52, 54. As long as $x_1+x_2-30 \geq 0$ the diode 40 will clamp the output of amplifier 38 to ground. However, when this constraint is violated, the resulting positive 30 volts applied by source 44 to the two integrators will cause a progressive change in the value of $x_1$ and $x_2$ in such a direction as will drive "point $x$" to a region satisfying this constraint, i.e., into the region bounded by the four graph lines in Figure 1. Illumination of lamp 62 indicates violation of the second constraint.

The voltage value of $x_2$ from amplifier 46 is also fed through resistance 64 to the input of a third constraint limiter comprising operational amplifier 66 with bypass diodes 68 and 70 and voltage source 72 similar to the corresponding components in the other limiters. A minus 10 volts is applied to this amplifier through resistance 66. Resistances 64 and 66 constitute an adding network such that the sum $(x_2-10)$ is actually applied to the amplifier input. By limiter action violation of the constraint function $x_2-10 \geq 0$ is detected and caused to produce a further change in the value of $x_2$ (i.e., increase of value of $x_2$) as a result of the positive 30 volts applied by source 72 through resistance 74 to the input of $x_2$ integrator 52, 54. Lamp 73 indicates a third constraint violation.

It will be evident that resistors 34 and 58 serve in an adding network such that the input of $x_1$ integrator 10, 12 is subjected to the sum of the constraint violation responses of the first two constraint switches or limiters. In a linear function problem such as this these responses represent constant voltage values, but in a more general sense, and particularly in nonlinear function problems as will later be described, the integrators are subjected to the time derivatives of the corresponding constraint functions with respect to the variable $x_1$. Likewise constraint violation responses of the second and third constraint switches, applied through the adding network comprising resistances 60 and 74 to $x_2$ integrator 52, 54, represent in general the sum of the derivatives of the second and third constraint functions with respect to $x_2$. For convenience, arbitrarily selected values of voltage of proper sign may be used to represent the constraint function derivatives, as here, since the already described purpose of deriving the derivative voltages is to apply suitable velocity components to the "point $x$" in order to cause it to move to a solution satisfying the constraints and minimizing the cost or criterion function. In the case of nonlinear constraint functions generation of actual derivative functions is required to insure that result.

Finally it is necessary in solving the problem under consideration to minimize the cost or criterion function $(20x_1+30x_2)$, that is, effectively "shift" it as close to the origin as possible without altering its slope, so that the final values of $x_1$ and $x_2$ represent a point on the shifted cost line which also satisfies the constraints. For this purpose derivatives of the cost function with respect to $x_1$ and $x_2$ are represented in terms of voltages applied as input components respectively to the $x_1$ and $x_2$ derivative integrators. These voltages are multiplied by $z$ however, a quantity which can be reduced to zero at will. In Figure 2, a minus 30 volts are applied across the windings of potentiometers 76 and 78. The wiper of potentiometer 76 is connected through adding network resistance 80 to the input of $x_1$ integrator 10, 12 while that of potentiometer 78 is connected through resistance 82, which is two-thirds the value of resistance 80, to the input of $x_2$ integrator 52, 54. The potentiometer wipers are ganged together and have a setting control 84. The reducible quantity $z$ represents the fraction of the total winding voltage picked off by the wipers, and may be reduced to zero at will. Thus voltages proportional to $20z$ and $30z$ are respectively applied as input components to the $x_1$ and $x_2$ derivative integrators. These voltages are made negative so that minimization of the cost function will occur. They would be positive if maximization were desired.

Preferably $z$ is made initially small enough that the actual cost function reducing voltages applied to the integrators during the initial phase of operation, wherein the constraints are being initially satisfied, do not unduly retard satisfaction of the constraints. Thereafter, when the constraint violation indicator lamps all become extinguished, $z$ is progressively reduced to substantially zero, permitting the cost function effectively to be moved to minimization with minimum violations of the constraints in the process of so doing. Finalization of the solution is indicated when the meters 86 and 88, indicating respectively the values of $x_1$ and $x_2$, reach a steady state condition with signal lights off.

The specific values chosen for the components in Figure 2 (this also being true of Figure 4 described below) are merely typical or representative of suitable values that may be used, and are not the only values practicable in such apparatus.

The $x_1$ and $x_2$ may be assigned any convenient initial values by temporarily closing switches 86 and 88 which apply the voltages selected from variable direct voltage sources 90 and 92 respectively to the integrator feedback condensers 12 and 54, as shown. Thereafter, with switches 86 and 88 opened to release these condensers from a fixed charge, the system automatically operates toward attaining its own solution.

In Figure 3 a relatively simple nonlinear function problem involving two unknowns $x_1$ and $x_2$ is graphically represented. It may be stated as follows:

Minimize criterion function $(2x_1+x_2+3)$     (C)

while maintaining $$e^{-.1x_1}-.1x_2 \leq 0 \quad (R_1)$$
$$x_1^2-10x_1+2.5x_2 \geq 0 \quad (R_2)$$
$$x_1^2+x_2^2-225 \leq 0 \quad (R_3)$$

Apparatus constituted for solving this problem in accordance with the invention is illustrated in Figure 4. In the latter figure, unknown $x_1$ is represented as a variable voltage in the output of integrator 100 (consisting of operational amplifier with feedback condenser), and $x_2$ in that of a similar integrator 102. Temporary initial values for these unknowns may be set by temporary initial closure of switches 104 and 106, and by proper settings of variable direct voltage sources 108 and 110 respectively. For instance, the "point $x$" may be positioned in this manner at starting points $P_1$ or $P_1'$, or any other location from which the point may be moved toward a solution to the problem.

The two integrators produce unknowns $x_1$ and $x_2$ by integrating the sums of the derivatives of the constraint and criterion functions with respect to each unknown. The sums of these derivatives with respect to $x_1$ and $x_2$ respectively are:

$$\frac{dx_1}{dt}=s_1(-.1e^{-.1x_1})+s_2(2x_1-10)+s_3(2x_1)-2z$$

$$\frac{dx_2}{dt}=s_1(-.1)+s_2(2.5)+s_3(2x_2)-z$$

where $$s_1=-1 \text{ if } R_1 \geq 0$$
$$s_1=0 \text{ if } R_1 < 0$$
$$s_2=1 \text{ if } R_2 \leq 0$$
$$s_2=0 \text{ if } R_2 > 0$$
$$s_3=-1 \text{ if } R_3 \geq 0$$
$$s_3=0 \text{ if } R_3 < 0$$

For convenience in the implementation of the equations in the computer the equations are preferably represented on a different scale, thus:

$$10R_1 = [(+10e^{-0.1x_1}) + (-x_2)]$$

$$0.1R_2 = \left[\frac{(+.01x_1^2)}{0.1} + (-x_1) + .25(+x_2)\right]$$

$$0.1R_3 = \left[\frac{(+.01x_1^2)}{0.1} + \frac{(+.01x_2^2)}{0.1} + .225(-100)\right]$$

$$+x_1 = -\int\left[.01s_1(+10e^{-0.1x_1}) + s_2(-2x_1+10)\right.$$
$$\left. + .2s_3\frac{(-x_1)}{0.1} + .2\left(\frac{-z}{0.1}\right)\right]dt$$

$$+x_2 = -\int\left[.001s_1(+100)\right.$$
$$\left. + .025s_2(-100) + .2s_3\frac{(-x_2)}{0.1} + (-z)\right]dt$$

$$C = -\left[.2\frac{(-x_1)}{0.1} + (-x_2) + .03(-100)\right]$$

The reason for this scale conversion will become apparent as the description proceeds with respect to the types of components conveniently used in the illustrated form of the computer.

In order to generate the derivative components of the constraint and criterion functions with respect to $x_1$, the output of integrator 100 is fed to a function generator 112 of any known or suitable type capable of converting the unknown $x_1$ into $10e^{-0.1x_1}$. The sign of this latter expression is changed by passing it through sign-changing operational amplifier 114. From the latter's output it passes to the input of integrator 100 through contact 116b of relay 116 when the latter is energized, through potentiometer 118 set to multiply the quantity $-10e^{-0.1x_1}$ by 0.01, and finally through resistance 121 comprising part of an adding network.

The second $x_1$ derivative component $(-2x_1+10)$ is derived by passing $x_1$ through potentiometer 119, which multiplies it by 0.2, thence through the adding network resistance 120, which multiplies the resultant by 10 in order to create the term "$2x$," and from there to the input of sign-changing amplifier 122 which produces the term $-2x$. A minus 10 volts is also applied to the input of amplifier 122 through adding network resistance 124 which is 10 times as large as resistance 120, whereby the quantity $+10$ appears in the amplifier output. The resulting expression $(-2x_1+10)$ is then passed to the input of integrator 100 through contact 126b of relay 126 when the latter is energized, and through adding network resistance 128 which is the same value as resistance 121.

The third $x_1$ derivative component, $$\frac{0.2(-x_1)}{0.1}$$

is derived by passing a signal representing a function of $x_1$ to the input of integrator 100. To this end $x_1$ is applied to sign-changing amplifier 129, from which the signal passes through contact 130b of relay 130 when the latter is energized, potentiometer 132 which multiplies $-x_1$ by 0.2, and finally through adding network resistance 134 which is one-tenth the value of resistances 121 and 128, hence divides the resulting product $0.2(-x_1)$ by 0.1 as desired.

The fourth $x_1$ derivative component, $$\frac{0.2(-z)}{0.1}$$

is derived by applying a selected value of voltage, such as 100 volts, across potentiometer 136 the setting of which represents the variable quantity $z$. The resulting quantity is then passed to the input of integrator 100 through a sign-changing amplifier 138, a multiplying potentiometer 140 which is set to multiply $-z$ by 0.2, thence through adding network resistance 142 which divides the product by 0.1 as desired.

The $x_1$ derivative components are all added together in the network comprising resistances 121, 128, 134 and 142 for applying their sum to integrator 100 by which the quantity $x_1$ is then produced, it being the negative of the integral of this sum.

In like manner the derivative components of the constraint and criterion functions with respect to $x_2$ are generated and added together for application to the input of integrator 102. The first such component, $.001(100)$, is produced by applying a positive 100 volts to the integrator input through contact 116d of relay 116 when the latter is energized, through potentiometer 144 which is set to multiply this voltage by 0.001, and finally through adding network resistance 146.

The second $x_2$ derivative term or component, $0.25(-100)$, is produced by applying a negative 100 volts to the integrator input through contact 126d of relay 126 when the latter is energized, through potentiometer 148 which is set to multiply this voltage by 0.025, and finally through adding network resistance 150 equal in value to resistance 146.

The third $x_2$ derivative term, $$\frac{0.2(-x_2)}{0.1}$$

is produced and applied to the input of integrator 102 by passing $x_2$ through sign-changing amplifier 152, contact 130d of relay 130 when the latter is energized, through potentiometer 154 which is set to multiply the resulting $-x_2$ by 0.2, and finally through adding network resistance 156 which is of such a value relative to resistances 146 and 150 as to divide the resultant by 0.1.

The last $x_2$ derivative component, $-z$, is applied to the input of integrator 102 by passing the output of sign-changing amplifier 138 through adding network resistance 158 of the same value as resistances 146 and 150.

When relay 116 is deenergized its grounded contacts 116a and 116c are engaged to connect the windings of potentiometers 118 and 144 to ground, so that no input voltage is applied through adding network resistances 121 and 146 to the inputs of integrators 100 and 102 respectively.

When relay 126 is deenergized its grounded contacts 126a and 126c are engaged to connect adding network resistance 128 and potentiometer 148 to ground, so that integrators 100 and 102 respectively then receive zero input voltage from these sources.

Likewise when relay 130 is deenergized its grounded contacts 130a and 130c are engaged to connect the windings of potentiometers 132 and 154 to ground for removing input voltage from the respective integrators through these channels.

It will be observed, therefore, that when relay 116 is energized all the derivative components of the first constraint function $(10R_1)$ with respect to both $x_1$ and $x_2$ are applied to the two integrators 100 and 102 to which they relate. However, zero input voltage is substituted for these components when relay 116 is deenergized. Similarly when relay 126 is energized all the derivative components of the second constraint function $(0.1R_2)$ with respect to both $x_1$ and $x_2$ are applied to the integrators to which they relate, otherwise these inputs are zero. The same is true with respect to relay 130 and the derivative components of the third constraint function $(0.1R_3)$.

An important feature of the apparatus is the provision of these relays or equivalent switch means and means for energizing each when the particular constraints to which they relate, as mentioned above, are violated. The apparatus therefore includes means for energizing relay 116 only when the first constraint is violated, relay 126 only when the second constraint is violated, and relay 130 only when the third constraint is violated.

In order to detect and remedy violation of the first constraint, the first constraint function is generated. Its first component is developed by applying the output of function generator 112 through adding network resistance 160 to the input of amplifier 168. The second component is generated by passing $x_2$ from integrator 102 through sign-changing amplifier 164 and adding network resistance 166, equal to resistance 164, to the input of amplifier 162. The net resultant input of amplifier 168 then becomes the expression for $10R_1$, as desired. When the value of this output becomes greater than zero the first constraint is violated. This condition is detected by providing operational amplifier 168 with diodes 170 and 172 connected in parallel with relatively opposite polarity between its output and input, with the anode of diode 170 on the side of the amplifier output. A direct voltage source 174 is interposed in series with diode 172 with its negative terminal directed toward the amplifier output. When an appreciable positive voltage is fed to the input of amplifier 168, resulting from violation of the first constraint, the amplifier output tends to become greatly negative and causes conduction of diode 172. However, the latter clamps the output voltage to the value fixed by source 174 which is selected as the desired energizing voltage of relay 116. Under these conditions relay 116 is energized and through its contacts voltages are applied to the inputs of integrators 100 and 102 such that, with initial condition switches 104 and 106 opened, the variables $x_1$ and $x_2$ will change in directions causing movement of point $x$ out of the region of violation of the first constraint. When this constraint is satisfied diode 170 clamps the output of amplifier 168 essentially to ground potential and relay 116 is then deenergized.

In order to detect and remedy violation of the second constraint, the second constraint function is generated. Its first component $$\frac{(+0.01x_1^2)}{0.1}$$

is developed by passing the voltage $x_1$ through a squaring device 176 of any known or suitable type which converts such voltage into $+0.01x_1^2$, thence through adding network resistance 178 which divides the resultant by 0.1 before application to the input of limiter amplifier 180. The second component, $-x_1$, of the second constraint function is developed by passing $x_1$ through sign-changing amplifier 182, thence through adding network resistance 184 to the input of amplifier 180. Resistance 184 is ten times the value of resistance 178. The third component, $0.25x_2$, is developed by passing $x_2$ through potentiometer 186 set to multiply it by 0.25, thence through adding network resistance 188 to the input of amplifier 180. Resistances 188 and 184 are equal. Amplifier 180 is connected as a limiter with associated bypass diodes 190 and 192 and a direct voltage source 194, with the diode and voltage source relationship being opposite that in the case of amplifier 168 because the second constraint is violated when the instantaneous value of its function becomes less than zero instead of greater than zero. Whenever the second constraint is violated the output of amplifier 180 tends to be highly positive and relay 126 will be energized by current flow through diode 190. Through the relay contacts voltages are applied to the inputs of integrators 100 and 102 such that, with initial condition switches 104 and 106 opened, the variables $x_1$ and $x_2$ will change in directions causing movement of point $x$ out of the region of violation of the second constraint. When this constraint is satisfied diode 190 conducts and clamps the output of amplifier 180 essentially to ground potential, and relay 126 is then deenergized.

In a similar manner, violation of the third constraint is detected for energization of relay 130 by generating the third constraint function and applying it to a limiter-amplifier 196. The first component $$\frac{0.01(x_1^2)}{0.1}$$

of the third constraint function is developed by passing the voltage $0.01x_1^2$ from squarer 176 through adding network resistance 198 to the input of amplifier 196. Resistance 198 has a value resulting in division of the squared quantity by 0.1. The second component $$\frac{0.01x_2^2}{0.1}$$

of the third constraint is derived by passing $x_2$ through a similar squaring device 200, through adding network resistance 202 equal to resistance 198, thence to the input of amplifier 196. The third component, $-22.5$, is derived by applying a minus 22.5 volts through adding network resistance 204 to the input of amplifier 196, where resistance 204 is ten times the value of resistance 202. The resulting value of the third constraint function at the input of amplifier 196 is positive when the constraint is violated, and relay 130 will be energized through conduction of diode 206 which is arranged with diode 208 and source 210 across amplifier 196 in the same manner as the similar components associated with amplifier 168. When relay 130 is energized voltages will be applied through its contacts to integrators 100 and 102 which will cause the point $x$ to move toward the region of satisfaction of the third constraint.

The apparatus is operated so that the derivative components of all the constraints are simultaneously applied to integrators 100 and 102. As first one constraint and then another becomes satisfied the related relay is automatically deenergized and the associated indicator lamp 116a, 126a or 130a extinguished. A relay associated with one constraint may become reenergized one or more times in the process if the changing values of $x_1$ and $x_2$ required to satisfy another constraint produce further violations of the first-mentioned constraint. Finally all of the constraints become satisfied and all relays are accordingly deenergized. Thereupon minimization of the criterion function to a solution of the problem is achieved by progressively reducing the quantity $z$ to zero by manipulation of potentiometer 136. In this process the same considerations govern the settings of the potentiometer as in the first described embodiment.

Meter 212 connected across the output of integrator 100 indicates the instantaneous value of $x_1$, while meter 214 connected across the output of integrator 102 indicates the instantaneous value of $x_2$. If desired, corresponding values of the cost may be derived and indicated on a separate meter (not shown).

In various specific problems to be solved, including the one under discussion, there may be more than one solution attainable by the apparatus, that is, more than one position for point $x$ representing the closest the criterion function can be moved to the point of origin without violating any of the constraints while following the particular path which the apparatus develops as a result of the initial settings of $x_1$ and $x_2$. One of these solutions is ordinarily better, i.e., at a lower minimum, than the other. Thus in Figure 3 it is obvious that if the cost line $(2x_1+x_2+3)$ is shifted to point $P_3$ it will furnish a lower value of cost than if it reaches only point $P_3'$. Yet both points represent "solutions" of the problem by the apparatus. Point $P_3$ is reached by starting with initial values of $x_1$ and $x_2$ placing the movable point $x$ at $P_1$, from which it proceeds generally to $P_2$, thence to $P_3$. However by setting up different initial values of $x_1$ and $x_2$, so as to position point $x$ at $P_1'$, for instance, the ultimate solution will generally be $P_3'$. In certain problems, therefore, it will be desirable to cause the apparatus to derive solutions starting with a number of different sets of values for $x_1$ and $x_2$ to ascertain whether there is in fact more than one solution and, if so, that the best or optimum solution is determined for the problem at hand.

It may be difficult to determine in advance whether a given programming problem has a solution or whether its solution is unique. The analog then becomes a convenient exploratory tool. Starting with various initial values for point $x$, and then noting the corresponding end points of the paths followed by $x$, gives an understanding of the conformation of the constraints and the possible solutions to the problem. If enough of these paths are traced so that the behavior of $x$ in a region of interest can be considered known, that region will have been "scanned." Sufficiently detailed scanning obtains the solution of any programming problem that has a solution.

It will be evident from the foregoing description of illustrative embodiments of the invention that apparatus incorporating the novel subject matter may be constituted to handle problems with any number of variables and any number of constraints, and that the constraint and criterion functions involved may be of any form if the components and the derivatives thereof with respect to each of the unknowns may be represented in apparatus form in accordance with the novel principles employed herein. It will also be observed that not only electrical but also mechanical or partially mechanical and partially electrical embodiments of the invention may be used to advantage in some cases. It will further be evident that certain equivalent arrangements insofar as technique for advancing the point $x$ to a solution may be used in lieu of those illustrated. For example, the "velocity" at which the point moves may be modified so as to be not merely a function of the derivatives but a function of the derivatives multiplied by a factor representing the degree of violation of the respective constraints thereby to expedite movement toward a solution, employ a continuous rather than a discontinuous "velocity vector" for point $x$, and minimize any tendency of the apparatus to oscillate back and forth across a constraint line once the constraint becomes satisfied. In case any of the constraint and criterion functions are discontinuous or do not have derivatives, they may be approximated piece by piece with smooth curves between which the related components are switched. Alternatively if the oscillations introduced by switching from one smooth part of the function to the next are tolerable the discontinuous function itself may be mechanized. These and similar variations with respect to details will be evident to those skilled in the art based on the foregoing description.

We claim as our invention:

1. Computer apparatus for determining the values of a plurality of unknowns which minimize or maximize a criterion function of said unknowns subject to constraints defined by constraint functions of said unknowns, which to be satisfied must have values equal to or different in one sense from predetermined values, respectively, said apparatus comprising, in combination, separate electrical integrating means related to the respective unknowns, each such integrating means having an input and having an output operable to represent the related unknown by a voltage proportional thereto, a plurality of electrical constraint function generators having inputs connected to said integrating means outputs and having outputs in which the values of said constraint functions are represented by proportional voltages for different values of said unknowns, respectively, electrical derivative function generators having inputs connected to said integrating means outputs and having outputs in which the respective terms of the time derivatives of said constraint functions with respect to said unknowns are represented respectively by proportional voltages, separate adding means for adding together said derivative voltages of all the constraint functions for each of said unknowns and applying the resultant thereof to the input of the corresponding integrating means, whereby the output of the latter represents the corresponding unknown voltage, relay means corresponding to each constraint and having sets of normally open contacts corresponding to the respective terms of said derivatives, said contacts being arranged in the connections of said derivative function generators to said adding means and respectively operable to interrupt application of said derivative voltage terms thereto, separate detecting means having inputs connected respectively to the outputs of said constraint function generators and arranged to detect values of the constraint function voltages which violate the respective constraints, said latter means being actuatingly connected to the respectively associated relays to actuate such relays and close said contacts thereof in response to violation of the corresponding constraints, and thereby apply the corresponding constraint derivative voltage terms to said integrating means, thereby to cause change in the values of said unknowns in a direction toward satisfaction of said constraint, means for deriving the time derivatives of said criterion function with respect to each of said unknowns and representing the terms thereof by voltages proportional thereto, said latter means being connected for applying the same to the corresponding integrating means in a sense to shift the criterion function toward the desired maximum or minimum subject to said constraints, means to indicate when the constraint functions are satisfied, and means to indicate the values of said unknowns.

2. Computer apparatus as defined in claim 1, and means connected with the respective integrating means and selectively and separately operable to vary the initial values of the unknown voltages represented thereby during initiation of operation of such apparatus, from which initial values such unknown voltages are caused to vary thereafter by operation of said apparatus.

3. Computer apparatus as defined in claim 2, wherein the detecting means comprises an operational amplifier having inputs respectively connected to the outputs of the constraint function generators and having outputs respectively connected to the relays for energizing the same, a pair of unidirectionally conductive devices connected in parallel with relatively opposite polarity between input and output of each such operational amplifier, and a direct voltage source connected directly in series with only one of said unidirectionally conductive devices in polarity opposition thereto whereby the output voltage of said amplifier becomes fixed by said source when the amplifier input voltage violates the corresponding constraint, thereby producing a tendency of the output voltage to vary in a sense producing conduction in said last mentioned unidirectionally conductive device, thereby to energize the corresponding relay.

4. Computer apparatus as defined in claim 3, wherein the integrating means comprise operational amplifiers having inputs and outputs, and capacitance elements connected between said inputs and outputs, respectively.

5. Computer apparatus for determining the values of a plurality of unknowns which minimize or maximize a criterion function of said unknowns subject to constraints defined by constraint functions of said unknowns, which to be satisfied must have values equal to or different in one sense from predetermined values, respectively, said apparatus comprising, in combination, separate electrical integrating means related to the respective unknowns, each such integrating means having an input and having an output operable to represent the related unknown by a voltage proportional thereto, a plurality of electrical constraint function generators having inputs connected to said integrating means outputs and having outputs in which the values of said constraint functions are represented by proportional voltages for different values of said unknowns, respectively, electrical means in which the respective terms of the time derivatives of said constraint functions with respect to said unknowns are represented respectively by proportional voltages, separate adding means for adding together said derivative voltages of all the constraint functions for each of said unknowns and applying the resultant thereof to the input of the corresponding integrating means, whereby the output of the latter represents the corresponding unknown, separate detecting means having inputs connected respectively to the outputs of said constraint function generators and arranged to detect values of the constraint function voltages which violate the respective constraints and apply the corresponding constraint derivative voltage terms to said integrating means in response to such violation, thereby to cause change in the values of said unknowns in a direction toward satisfaction of said constraint, means for deriving the time derivatives of said criterion function with respect to each of said unknowns and representing the terms thereof by voltages proportional thereto, said latter means being connected for applying the same to the corresponding integrating means in a sense to shift the criterion function toward the desired maximum or minimum subject to said constraints, and means to indicate the values of said unknowns.

6. Computer apparatus as defined in claim 5, and means connected with the respective integrating means and selectively and separately operable to vary the initial values of the unknowns represented thereby during initiation of operation of such apparatus, from which initial values such unknowns are caused to vary thereafter by operation of said apparatus.

7. Computer apparatus as defined in claim 6 for solving linear function problems, wherein the detecting and constraint derivative representing means together comprise operational amplifiers having inputs respectively connected to the outputs of the constraint function generators and having outputs respectively connected to the particular adding means in the inputs of the integrating means for such of said unknowns as appear in the constraint functions respectively represented by said constraint function generators, a pair of unidirectionally conductive devices connected in parallel with relatively opposite polarity between input and output of each such operational amplifier, and a direct voltage source connected directly in series with only one of said unidirectionally conductive devices in polarity opposition thereto whereby the output voltage of said amplifier, representing the corresponding constraint derivative voltage for each unknown appearing in such constraint, becomes fixed by said source when the amplifier input voltage violates the corresponding constraint, thereby producing a tendency of the output voltage to vary in a sense producing conduction in said last mentioned unidirectionally conductive device.

8. Computer apparatus for determining the values of a plurality of unknowns which minimize or maximize a criterion function of said unknowns subject to constraints defined by constraint functions of said unkowns, which to be satisfied must have values equal to or different in one sense from predetermined values, respectively, said apparatus comprising, in combination, separate integrating means related to the respective unknowns, each such integrating means having an input and having an output operable to represent the related unknown, a plurality of constraint function generators having inputs connected to said integrating means outputs and having outputs in which the values of said constraint functions are represented for different values of said unknowns, respectively, derivative function generators having inputs connected to said integrating means outputs and having outputs in which the derivatives of said constraint functions with respect to said unknowns are represented respectively, separate adding means for adding together said derivatives of all the constraint functions for each of said unknowns and applying the resultant thereof to the input of the corresponding integrating means, whereby the output of the latter represents the corresponding unknown, switch means respectively arranged in the connections of said derivative function generators to said adding means and operable to interrupt application of said derivatives thereto, separate detecting means having inputs connected respectively to the outputs of said constraint function generators and arranged to detect the transition between violation and satisfaction of the respective constraint functions, said latter means selectively controlling said switch means to operate the particular switch means corresponding to the derivatives of any constraint function violated by the instantaneous values of said unknowns, thereby to cause change in the values of said unknowns in a direction toward satisfaction of said constraint, means for deriving the derivatives of said criterion function with respect to each of said unknowns and for applying the same to the corresponding integrating means in a sense to shift the criterion function toward the desired maximum or minimum subject to said constraints, means to indicate when the constraint functions are satisfied, means operable to reduce to substantially zero the values of said criterion function derivatives applied to said integrating means, and means to indicate the values of said unknowns.

9. Computer apparatus as defined in claim 8, and means connected with the respective integrating means and selectively and separately operable to vary the initial values of the unknowns represented thereby during initiation of operation of such apparatus, from which initial values such unknowns are caused to vary thereafter by operation of said apparatus.

10. Computer apparatus for determining the values of a plurality of unknowns which minimize or maximize a criterion function of said unknowns subject to constraints defined by constraint functions of said unknowns, which to be satisfied must have values equal to or different in one sense from predetermined values, respectively, said apparatus comprising, in combination, analog means to represent the individual unknowns in analog form, such means being adapted for energization thereof selectively to vary the values of the respective unknowns represented thereby up or down, constraint representing means controlled by said analog means and operable to represent the values of the respective constraints produced by different values of said unknowns, individual detecting means responsive to the respective constraint representing means and operable thereby to detect violation of such constraints, constraint derivative representing means controlled by said individual detecting means and in turn connected to said analog means for energizing each such latter means to vary the respective unknowns in a sense leading out of the region of violation of any of said constraints, in response to detection of violation of any such constraint, criterion derivative representing means connected to said analog means and operable for energizing the same in a sense to minimize or maximize the criterion function, and indicator means connected to said analog means for indicating the respective values of said unknowns.

11. Computer apparatus for determining the values of a plurality of unknowns which minimize or maximize a criterion function of said unknowns subject to constraints defined by constraint functions of said unknowns, which to be satisfied must have values equal to or different in one sense from predetermined values, respectively, said apparatus comprising, in combination, electrical time analog integrating means to represent the individual unknowns in electrical time analog form, such means having an input adapted for energization thereof selectively to vary the values of the respective unknowns represented thereby up or down by integration of the input energization, constraint representing means controlled by said analog integrating means and operable to represent electrically the values of the respective constraints produced by different values of said unknowns, individual detecting means responsive to the respective constraint representing means and operable thereby to detect violation of such constraints, constraint derivative representing means controlled by said individual detecting means and in turn connected to the inputs of said analog integrating means for energizing each such latter means to vary the respective unknowns in a sense leading out of the region of violation of any of said constraints, in response to detection of violation of any such constraint, means connected to said detecting means for indicating satisfaction of said constraints, criterion derivative representing means connected to said analog integrating means and operable for energizing the same in a sense to minimize or maximize the criterion function, said criterion derivative representing means being adjustable to reduce such analog means energization progressively to zero, and indicator means connected to said analog means for indicating the respective values of said unknowns.

12. The apparatus defined in claim 11, and means connected to the integrating means and operable at will to vary the initial values of the unknowns represented thereby.

13. In an electrical computer system for minimizing or maximizing a criterion function of a plurality of unknowns without violating predetermined constraints represented by constraint functions of said unknowns, the combination comprising means to represent said unknowns as variable voltages, means operable to vary said voltages in a sense and until said constraints are satisfied, said latter means including means responsive to said voltages to detect the values of said constraint functions for different values of said unknowns, means operable to vary said variable voltages at a rate and in a sense to minimize or maximize the value of said criterion function, and means connected with said second-named means for indicating violation of the constraints, thereby to indicate arrival at the minimum or maximum of said criterion function.

14. The system defined in claim 13, and means connected to the first-named means and operable at will to vary the initial values of the unknowns represented thereby.

15. Analog programming computer apparatus, comprising means to represent a plurality of unknowns in analog form, integrating means to represent in analog form the derivatives of a plurality of constraint functions and a criterion function of said unknowns, with respect to said unknowns, wherein said criterion function is to be minimized or maximized subject to said constraints, means controlled by said constraint representing means and operated only by violation of any constraint for applying the analogs of the terms of said derivatives of said constraint with respect to each unknown to the integrating means corresponding to such unknowns, respectively, for producing a change in the values of the analogs of said unknowns in a sense to satisfy said constraint, and means applying to said integrating means the corresponding terms of the analog representation of said criterion function with respect to said unknowns.

16. The apparatus defined in claim 15, and means connected with the integrating means and operable to vary the initial values of the analogs of the respective unknowns represented thereby.

17. A system for determining the values of a plurality of unknowns which will minimize or maximize a criterion function of said unknowns while satisfying a plurality of constraint comprising functions of said unknowns, said system comprising means deriving voltages representing said unknowns, means deriving as voltages the terms of time derivatives of said criterion and constraint functions with respect to each of said unknowns, means integrating said terms for each such unknown to produce the first voltages and to produce variation of such voltages in a sense to approach satisfaction of said constraints respectively, and means electrically detecting satisfaction of each such constraint and in response thereto eliminating the terms of the derivative thereof with respect to said unknowns from the process of integration, thereby to attain a minimum or maximum of said criterion function with said unknowns satisfied.

18. A system for determining the values of a plurality of unknowns which will minimize or maximize a criterion function of said unknowns while satisfying a plurality of constraints comprising functions of said unknowns, said system comprising means deriving analogs representing said unknowns, means deriving as similar analogs the terms of time derivatives of said criterion and constraint functions with respect to each of said unknowns, means integrating said terms for each such unknown to produce the first analogs and to produce variation of such analogs in a sense to approach satisfaction of said constraints, respectively, and means detecting by response to such analogs satisfaction of each such constraint and in response thereto eliminating the terms of the derivative thereof with respect to said unknowns from the process of integration, and including means operable upon detecting satisfaction of all such constraints progressive to reduce to zero the terms of the derivatives of said criterion function integrated, thereby to attain a minimum or maximum of said criterion function with said constraint satisfied.

References Cited in the file of this patent

UNITED STATES PATENTS

| | | |
|---|---|---|
| 2,519,262 | Lovell | Aug. 15, 1950 |
| 2,703,203 | Bishop | Mar. 1, 1955 |
| 2,836,730 | Early | May 27, 1958 |
| 2,916,212 | Mita | Dec. 8, 1959 |

FOREIGN PATENTS

| | | |
|---|---|---|
| 1,100,838 | France | Apr. 13, 1955 |
| 745,660 | Great Britain | Feb. 26, 1953 |

OTHER REFERENCES

Electronic Analog Computers (Korn & Korn), 1952, page 290.

Electronics (Morrill), November 1952, pages 125 and 126.

Control Engineering (Russell et al.), pages 21 and 22, February 1956.

Trans. of the AIEE (Pyne), May 1956, pp. 139–143.